Figures 1, 2:
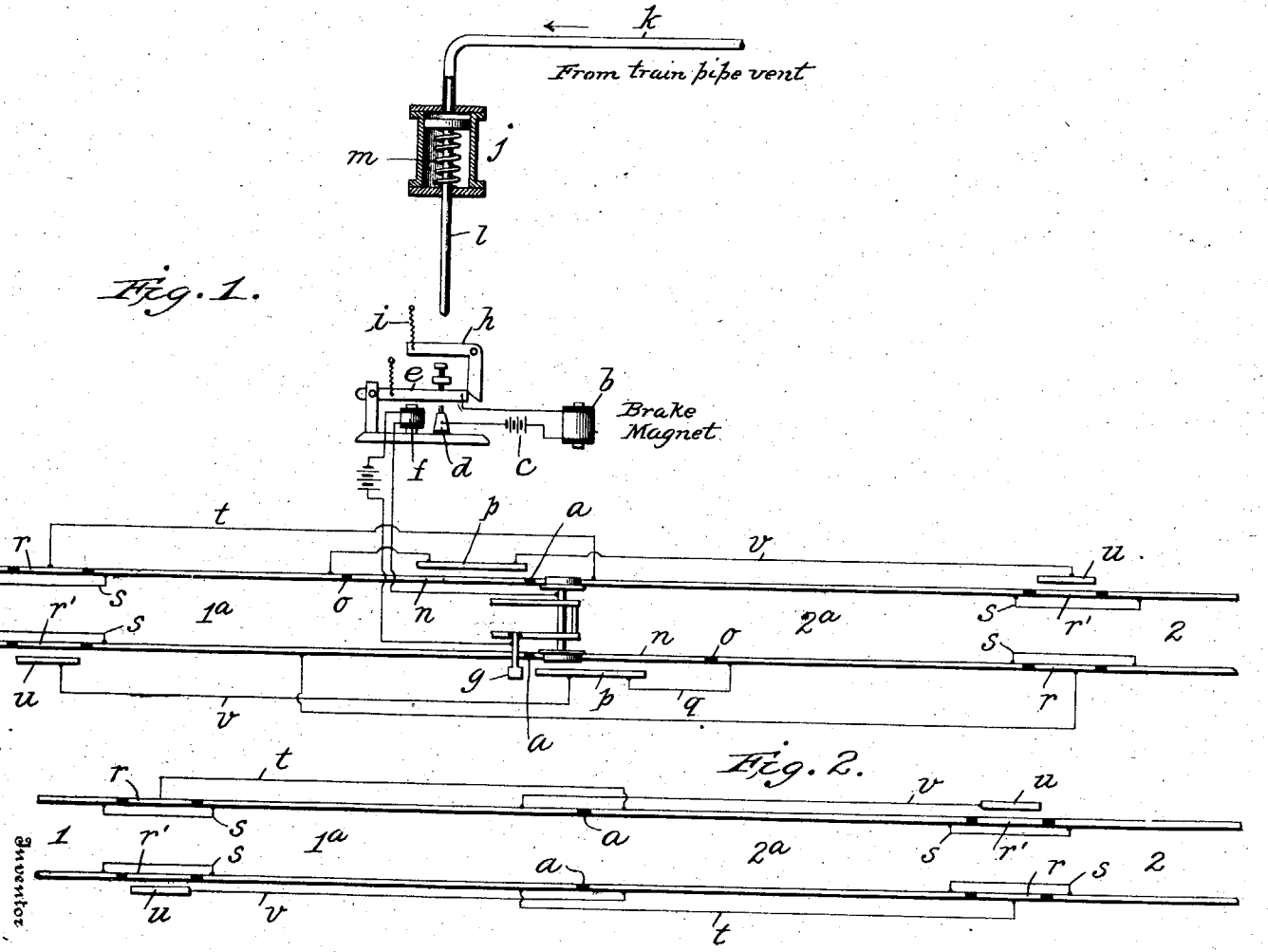

No. 12,783. REISSUED APR. 21, 1908.

H. G. SEDGWICK.

AUTOMATIC TRAIN STOP.

APPLICATION FILED SEPT. 28, 1907.

Witnesses

Edwin L. Yewell

S. H. Bridges

Inventor,

Hiram G. Sedgwick,

By Davis & Davis

Attorneys

UNITED STATES PATENT OFFICE.

HIRAM GEE SEDGWICK, OF MILL VALLEY, CALIFORNIA, ASSIGNOR TO AMERICAN TRAIN STOP COMPANY, OF SAN FRANCISCO, CALIFORNIA, A CORPORATION OF CALIFORNIA.

AUTOMATIC TRAIN-STOP

No. 12,783. Specification of Reissued Letters Patent. Reissued Apr. 21, 1908.

Original No. 864,866, dated September 3, 1907, Serial No. 345,506. Application for reissue filed September 28, 1907. Serial No. 395,053.

*To all whom it may concern:*

Be it known that I, HIRAM GEE SEDGWICK, a citizen of the United States, and a resident of Mill Valley, county of Marin, State of California, have invented certain new and useful Improvements in Automatic Train-Stops, of which the following is a full and clear specification, reference being had to the accompanying drawings, in which—

Figure 1 is a diagram of the adjacent ends of two adjacent blocks, showing part of the brake-applying mechanism of the locomotive; and Fig. 2 a plan view showing a simpler arrangement of the roadbed devices.

The object of this invention is to provide an extremely simple system whereby a train will be automatically stopped upon entering or attempting to enter a block occupied by another train, whether that train be at a standstill or moving in either direction, as more fully hereinafter set forth.

In the drawing the adjacent ends of two blocks 1 and 2 are shown, the main rails of which are bonded in the usual way to carry current from one end of the block to the other. The blocks are separated at their adjacent ends, as is common nowadays, by suitable insulation *a*. In the present instance the invention is shown applied to a single track road, so that provision is made for stopping trains going in either direction. The devices carried by the locomotive embrace a brake-magnet *b*, which may be arranged to actuate the venting valve or any other train-stopping or signal devices on the train.

One branch of the circuit of this magnet contains a battery *c* and is connected to a stationary contact *d*, while the other branch is connected to a movable contact *e* normally held up away from contact *d* but adapted to be drawn down into contact with the part *d* by means of an electro-magnet *f*. One branch of the circuit of this magnet *f* is connected preferably through a battery to a suitable collecting brush or shoe *g* mounted insulatedly upon a suitable part of the locomotive, while the other branch of this circuit is connected with the forward axle of the locomotive in any suitable manner. It will be observed therefore that when this circuit is closed the arm *e* will be drawn down, thereby closing the circuit of magnet *b* and operating the brake-applying means. To insure the operation of the brake applying devices I provide means for automatically holding the brake-magnet circuit closed after the circuit of magnet *f* is once closed, the means for doing this in the present instance consisting of a pivotally hung angle arm *h* whose depending end is normally held against the end of arm *e* by means of an upward pulling spring *i*, so that when the arm *e* is snapped down the lower beveled end of the lock-arm *h* is pulled over the end of the arm *e* and said arm is thus kept pressed down on contact *d*. This automatic lock is preferably used in combination with suitable means for automatically unlocking it as soon as it is certain that the brake has been applied but not before. In the present instance I employ a small cylinder *j* to the upper end of which is connected a pipe *k* which leads from the usual vent of the train-pipe, and in the cylinder I mount a piston carrying a stem *l* surrounded by a spring *m* to normally hold up the piston and depending to a point in close proximity to the horizontal arm of the angle lock. With this device at least part of the air which escapes from the train-pipe upon applying the brakes passes into the cylinder and forces down the piston until its stem trips the locking lever and allows upper contact *e* to rise; and when the air is vented from pipe *k* the spring *m* raises the piston and thus allows the locking arm to assume its normal position.

Referring again to the roadbed devices, a portion *n* of the right hand rail at the beginning of each block is insulated at each end from the remainder of the rail, that is, is completely isolated as at no time is this part of the rail used as a conductor. As will be observed the block of insulation *a*, heretofore described, insulates this rail at one end, and at its other end it is insulated from the main part of the block rail by another block of insulation *o*. Adjacent to each of these isolated rail sections *n* is a contact rail *p* which is arranged on the roadbed in such position that brush *g* will make contact with it as the locomotive passes. This contact rail extends from approximately opposite the insulated joint *a* to a point sufficiently short of the insulation *o* to insure the brush *g* leaving this contact rail before the adjacent front wheel of the locomotive passes off the isolated rail section *n*. This contact rail is connected by wire *q* to the adjacent main rail of the block at a point beyond the forward end of the isolated rail *n*.

At a suitable distance from each end of each block opposite sections *r* and *r'* of the rails are insulated from the main rails of the block, and in order that these insulated sections shall not break the electric continuity of the block rails the ends of the respective rails adjacent to these insulated sections are connected by conductors *s*. The rail section *r* is connected to the main rail of the adjacent block at the same side of the track by means of a conductor *t*, so that said section *r* constitutes electrically a part of the block immediately ahead. The opposite section *r'* is entirely isolated and is in its function supplemental to the isolated section *n* next ahead. Adjacent to this isolated section *r'* is a contact rail *u* which is connected by a conductor *v* to the next succeeding contact rail *p*, so that this contact rail *u* is in fact supplemental to contact rail *p*, in the present form of the apparatus.

Assuming that a train is in block 2 and another train is approaching block 2 from block 1 and reaches the contact rail *u* first, the operation of the parts will be as follows: As soon as the brush on the locomotive makes contact with rail *u* a circuit will be completed through the brush, magnet *f*, preferably the forward axle of the locomotive, conductors *t* and *v*, contact rail *p*, conductor *q*, the main rails of block 2 and the forward axle of the locomotive in block 2. If a train passes into block 2 after the locomotive of the oncoming train has passed from contact rail *u*, or if the circuits *t* and *v* are disrupted, the train we are following will be stopped at contact rail *p* in the same manner. This contact rail *p* is made shorter than the adjacent isolated rail section *n* in order to prevent the train in question stopping itself by short-circuiting through conductor *q* and the front wheels and axle of the locomotive which would be the case if the front wheels of the locomotive passed over insulation *o* before the brush *g* left the contact rail. As will be obvious the same operations take place with a train going in the opposite direction, that is, from block 2 to block 1.

It will probably be desirable, in order that the apparatus will act with locomotives that are backing to duplicate the brush circuit on the opposite side of the locomotive and employ a reversing switch on the locomotive such for instance as is shown in my co-pending application No. 321,762, filed June 14, 1906.

In the simpler form of my system shown in Fig. 2 the contact rails *p* and the isolated sections *n* of the track rails are omitted. In this modification, as well as in the arrangement shown in Fig. 1, it will be observed that my system provides at the end of each block a protected zone or area lettered respectively $1^a$ and $2^a$. These protected sections or zones would each be in practice sufficiently long to enable a train passing into them from either end to be brought to rest by a service stop thus avoiding injury to the rolling stock by an emergency application of the brake, that is to say, each of these end sections should be long enough to bring the train to a standstill when the valve is actuated before it passes onto the isolated rail section *n*, Fig. 1, and over joints *a* in Fig. 2, so that the train will, even when brought to a standstill, still serve to electrically connect the rails of the block and thus prevent the oncoming train in the block ahead from passing out of its block. It will be understood that all the rail sections of each block are properly bonded except of course the insulated sections *n*, *r* and *r'*.

It will be observed that whether the arrangement shown in Fig. 2 be used alone or in combination with the staggered-joint arrangement shown in Fig. 1, the rail *r* must not only be insulated from the block it is in and be electrically connected to the left-hand rail of the block ahead, but it must also be so located with respect to a contact-rail that simultaneously with contact of the wheel or wheels of the locomotive with it the brush shall wipe the contact rail, this contact rail being necessarily electrically connected to the right-hand rail of the block just ahead and being of such length and location that the brush must leave it before any of the wheels of the locomotive pass onto said right-hand rail, for the purpose set forth. It will be observed also that the isolated rail sections *n* and *r'* perform no function except as a precaution against leakage of current and to prevent interference with other electrical appliances connected to the block-rails.

Having thus fully described my invention, what I claim and desire to secure by Letters Patent is:—

1. In an apparatus of the class set forth, a brake magnet and circuit on the locomotive and means for opening and closing said circuit, said means embodying relatively movable contacts and a magnet and circuit and also means on the roadbed for closing this last named circuit, means for automatically holding the brake-magnet circuit closed when once closed by the roadbed devices, means for disengaging said holding means, and means for actuating this latter means by the application of the brake.

2. In an apparatus of the class set forth, a brake magnet and circuit on the locomotive and means for opening and closing said circuit, said means embodying relatively movable contacts and a magnet and circuit and also means on the roadbed for closing this last named circuit, and means for automatically holding the brake-magnet circuit closed when once closed by the roadbed devices, and means for opening the brake-magnet circuit operated by the application of the brake.

3. In a railway block system, means on the train for electrically operating the brake mechanism embodying a circuit one branch of which is connected to an insulated brush and the other branch of which is connected to one of the axles, and roadbed devices consisting of a series of rail blocks insulated at *a* from each other, an isolated rail section *n* at the beginning of the right-hand side of each block, and a contact rail along side each isolated rail section in line with the brush on the locomotive and electrically connected to the adjacent end of the right-hand rail of the preceding block, for the purpose set forth.

4. In an apparatus of the class set forth, brake-applying mechanism embodying a circuit one branch of which is connected with the forward axle of the locomotive and the other branch of which is connected to the brush on the locomotive, roadbed devices for closing said circuit embodying an isolated rail section, a contact rail adjacent to and shorter than said isolated rail, this contact rail being electrically connected to the adjacent end of one of the block rails.

5. In a railway block system, means on the train for electrically operating the brake mechanism embodying a circuit one branch of which is connected to an insulated brush and the other branch of which is connected to one of the axles, and roadbed devices consisting of a series of rail blocks insulated at *a* from each other, an isolated rail section *n* at the beginning of the right-hand side of each block, and a contact rail along side each isolated rail section in line with the brush on the locomotive and electrically connected to the adjacent end of the right-hand rail of the preceding block, said contact rail being arranged so that the brush leaves it before the adjacent wheel passes onto the rail to which it is electrically connected, for the purpose set forth.

6. In combination, adjacent blocks whose rails serve as electrical conductors, said blocks being insulated from each other, opposite insulated rail sections at a distance from each end of the blocks, one of each pair of these sections being connected to one of the rails of the next adjacent block and the other of said pair being isolated, a contact rail adjacent this isolated section and electrically connected to the rails of the next adjacent block section, and automatic devices on the train adapted to coöperate with said roadbed devices.

7. In a railway automatic stopping system, a series of block rails insulated from each other at their adjacent ends, a pair of opposite insulated rail sections adjacent to each end of each block, the adjacent main rails of each block being electrically connected around these insulated sections, means electrically connecting one of each pair of these insulated sections to one of the rails of the block next ahead, a contact rail adjacent the other one of said pair of insulated rail sections, and means connecting this contact rail to the other rail of the block next ahead.

8. In combination with means on the train for setting the brakes, said means embodying a circuit one branch of which is connected to an insulated brush and the other of which is connected to one of the axles, a series of rail blocks insulated from each other at their adjacent ends, an isolated rail section at the right-hand side at the head of each block, a contact rail adjacent each of these isolated rails and electrically connected to the adjacent end of the block rail just ahead, a pair of insulated rail sections *r* and *r'* near the end of each block, the main rails being bonded around these insulated sections, a contact rail adjacent one of each pair of these rails, and means connecting one of each pair of rails to one of the rails of the block next ahead and means electrically connecting the opposite contact rail to the other rail of the block just ahead.

9. In combination with electrical devices on the train embodying a circuit one branch of which is connected to one of the axles and the other branch of which is connected to a contact brush or shoe, of automatic roadbed devices comprising a series of sections of rail blocks insulated from each other at their ends at *o*, these points of insulation being out of line with each other transversely, the one at the right-hand side being at a point just ahead of the one on the left-hand side, so that in moving in either direction the left-hand forward wheel of the locomotive will pass onto the left-hand rail of the block ahead before the right-hand wheel passes over the right-hand joint *o*, and a contact rail at each side adjacent to each joint, this contact rail being so positioned and proportioned as to length that the left-hand wheel passes over the left-hand joint *o* before the brush makes contact with the contact rail and the brush leaves the contact rail before the right-hand wheel passes over the adjacent joint *o*, for the purpose set forth.

10. In combination with automatic electrical devices on the locomotive embodying a circuit one branch of which is connected to one of the axles and the other branch of which is connected to an insulated brush or contact shoe, of roadbed devices embodying blocks of rails insulated from each other at their ends as at *o*, these points of insulation being out of line with each other transversely, the insulated joint at the right side being at a point ahead of its companion joint, and a contact rail on the roadbed adjacent each right hand rail and terminating short of the insulated joint just ahead, and means electrically connecting this rail with the adjacent rail just ahead of the insulated joint.

11. In a railway block system, means on the train for electrically operating the brake mechanism embodying a circuit one branch of which is connected to an insulated brush and the other branch of which is connected to one of the axles, and roadbed devices consisting of a series of rail blocks insulated from each other, a contact rail on the roadbed a distance from the entrance of each block and electrically connected to one of the rails of said block ahead, a section *r* of one of the block-rails adjacent to said contact-rail being insulated from the block it is in and being connected to the other one of the rails in the block ahead.

12. In a railway block system, means on the train for electrically operating the brake mechanism embodying a circuit one branch of which is connected to an insulated brush and the other branch of which is connected to one of the axles, and roadbed devices consisting of a series of rail blocks insulated from each other, a contact rail on the roadbed a distance from the entrance of each block and electrically connected to one of the rails of said block ahead, said contact rail being so positioned and proportioned that the brush shall leave it before the forward wheel of the locomotive crosses the block insulations, a section *r* of one of the block-rails adjacent to said contact-rail being insulated from the block it is in and being connected to the other one of the rails in the block ahead.

13. In an apparatus of the class set forth, a brake-magnet and circuit on the locomotive and means for opening and closing said circuit embodying a roadbed circuit, means for automatically holding the brake-magnet circuit closed when once closed by the roadbed circuit, and automatic means for disengaging the holding means after the energization of the brake-magnet during the act of venting.

In testimony whereof I hereunto affix my signature in the presence of two subscribing witnesses, this 18th day of September, 1907.

HIRAM GEE SEDGWICK.

Witnesses:
S. H. Roberts,
D. C. Braid.